United States Patent [19]
Steininger Clites et al.

[11] Patent Number: 5,955,537
[45] Date of Patent: Sep. 21, 1999

[54] CONTINUOUS POLYMERIZATION PROCESS

[75] Inventors: Jean Steininger Clites, North Canton; Howard Allen Colvin, Tallmadge; Ronald David Fiedler, Atwater, all of Ohio

[73] Assignee: The Goodyear Tire & Rubber Company, Akron, Ohio

[21] Appl. No.: 09/023,730

[22] Filed: Feb. 13, 1998

[51] Int. Cl.$^6$ ............................. C08F 2/06; C08F 297/04
[52] U.S. Cl. ............................. 525/53; 525/271; 525/316; 526/65; 526/336
[58] Field of Search ......................... 526/65, 336; 525/53, 525/271, 316

[56] References Cited

U.S. PATENT DOCUMENTS

| | | | |
|---|---|---|---|
| 4,145,322 | 3/1979 | Maldonado et al. | 260/28.5 |
| 4,311,803 | 1/1982 | Smith et al. | 525/53 |
| 5,002,987 | 3/1991 | Schulz | 524/60 |
| 5,194,491 | 3/1993 | Sakita et al. | 525/53 |
| 5,219,901 | 6/1993 | Burke et al. | 523/205 |
| 5,262,240 | 11/1993 | Dunning et al. | 428/404 |
| 5,534,568 | 7/1996 | Schulz et al. | 524/69 |
| 5,837,756 | 11/1998 | Steininger Clites et al. | 525/316 X |

OTHER PUBLICATIONS

U.S. Patent Application Ser. No. 08/864,098, filed on May 28, 1997, and allowed on Jun. 24, 1998, (not yet issued).

Primary Examiner—Fred Teskin
Attorney, Agent, or Firm—Alvin T Rockhill

[57] ABSTRACT

This invention discloses a process for synthesizing a styrene-butadiene polymer which comprises the steps of: (1) continuously charging 1,3-butadiene monomer, an organo-lithium compound, a polar modifier and an organic solvent into a first polymerization zone, (2) allowing the 1,3-butadiene monomer to polymerize in said first polymerization zone to a conversion of at least about 90 percent to produce a living polymer solution, (3) continuously withdrawing said living polymer solution from said first polymerization zone, (4) continuously charging divinyl benzene and the living polymer solution being withdrawn from the first polymerization zone into a second polymerization zone, (5) allowing the divinyl benzene monomer to react with the living polybutadiene chains in said second polymerization zone to produce a solution of living divinylbenzene modified butadiene polymer, (6) continuously withdrawing the solution of said divinylbenzene modified butadiene polymer from the second polymerization zone, (7) continuously charging styrene and the living divinylbenzene modified butadiene polymer being withdrawn from the second polymerization zone into a third polymerization zone, (8) allowing the styrene to polymerize in the third polymerization zone to produce a solution of styrene-butadiene polymer having a number average molecular weight which is within the range of about 30,000 to about 85,000 and (9) continuously withdrawing the solution of styrene-butadiene polymer from the third polymerization zone.

22 Claims, No Drawings

CONTINUOUS POLYMERIZATION PROCESS

BACKGROUND OF THE INVENTION

The importance of roads and highways has been appreciated since the time of the Roman Empire. By about 300 B.C., the first section of the Appian Way extending from Rome to Capua was built. Some of the more than 50,000 miles (80,450 km) of roadway ultimately built in the Roman Empire was constructed with heavy stone. However, not much progress was made in the art of road construction from the era of the Roman Empire until the development of the motor vehicles, such as automobiles and trucks.

For centuries, stone blocks, wood blocks, vitrified brick and natural asphalt (bitumen) have been used to pave roads and highways. However, at the beginning of the automobile era, most rural roadway surfacing consisted of broken stone or gravel. Such roads were often rough, dusty and clearly inadequate for modern automobile and truck traffic.

Today, the United States has the most extensive highway system in the world with about 2,000,000 miles (3,218,000 km) of paved road. Napoleon realized the importance of roadway systems and built such a system in France which today has the second most extensive system of paved roadways in the world covering about 500,000 miles (804,500 km). Germany, Japan, Great Britain, India and Australia also currently have systems of paved roads which extend well over 100,000 miles (160,900 km). In addition to these public roadways, there are countless paved driveways and parking lots all over the world.

Today, roads, highways, driveways and parking lots are often paved with asphalt concrete. Pavement can be made with asphalt concretes which are dust-free, smooth and which offer the strength required for modern automobile and heavy truck traffic. Asphalt concrete is generally made by mixing aggregate (sand and gravel or crushed stone) with the proper quantity of an asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble-free. One major problem encountered with asphalt concrete pavements is the loss of the adhesive bond between the aggregate surface and the asphalt cement. This breaking of the adhesive bond between the asphalt cement and the aggregate surface is known as "stripping." The stripping of asphalt binder from aggregate surfaces results in shorter pavement life and many millions of dollars of maintenance work on American highways each year. Reduction of this stripping tendency is of great interest when trying to improve conditions of roads and lowering these maintenance costs.

Over the years, various methods have been developed to reduce stripping tendencies. For instance, amines and lime are known to act as anti-stripping agents and are frequently applied to the surface of the aggregate prior to mixing it with the asphalt cement in making asphalt concrete. U.S. Pat. No. 5,219,901 discloses a technique for reducing stripping tendencies which involves coating the aggregate with a thin, continuous film of a water-insoluble high molecular weight organic polymer, such as an acrylic polymer or a styrene-acrylic polymer.

U.S. Pat. No. 5,262,240 discloses a technique for providing aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

At high service temperatures, such as those experienced on hot summer days, asphalt concrete can experience rutting and shoving. On the other hand, at low service temperatures, such as those experienced during cold winter nights, asphalt concrete can also experience low temperature cracking. To combat these problems, it is known in the art to modify asphalt cements with rubbery polymers, such as styrene-butadiene rubber (SBR). In some approaches, the SBR is added to the asphalt as a dry rubber while, in others, it is added as a latex. Such modification techniques can greatly improve resistance to rutting, shoving and low temperature cracking. However, the rubbery polymers used in such applications have a tendency to phase separate from hot asphalt cements due to poor compatibility. A solution to the problem of poor compatibility is offered by the technique disclosed in U.S. Pat. No. 5,002,987.

U.S. Pat. No. 5,002,987 relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity of less than 50. The latex is a random polymer comprising from about 60 to 100 weight percent of at least one conjugated diolefin containing from 4 to 6 carbon atoms and from about 0 to 40 weight percent styrene. This latex polymer is highly compatible with the asphalt and provides good ductility which results in good resistance to low temperature cracking. However, the utilization of the rubbery polymers described in U.S. Pat. No. 5,002,987 in asphalt cements provide little improvement in elastic recovery or toughness. Thus, their use results in compromised rutting and shoving characteristics. There accordingly is a current need for a modifier which is compatible with asphalt cement and which improves the resistance of asphalt concrete made therewith to rutting, shoving and low temperature cracking.

U.S. Pat. No. 5,534,568 reveals an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer and (c) about 0.1 weight percent to about 3 weight percent of isobutoxymethyl acrylamide.

U.S. Pat. No. 4,145,322 discloses a process for making a bitumen-polymer composition which consists of contacting with each other, at a temperature between 130° C. and 230° C., 80 to 98 weight percent of a bitumen exhibiting a penetration value between 30 and 220 and 2 to 20 weight percent of a block copolymer, with an average molecular weight between 30,000 and 330,000 having the theoretical formula Sx-By in which S corresponds to the styrene structure groups, B corresponds to the conjugated diene structure groups and x and y are integers, stirring the obtained mixture for at least two hours, then adding 0.1 to 3 percent by weight of elemental sulfur with respect to the bitumen and maintaining the mixture thus obtained under agitation for at least 20 minutes.

Batch polymerization techniques are normally used in synthesizing block copolymers which are utilized in modifying asphalt in order to attain desired performance characteristics. However, it would be highly desirable from a cost standpoint to be capable of synthesizing such polymers by utilizing continuous polymerization techniques. It would also be highly desirable to increase the force ductility, elastic recovery, toughness and tenacity of asphalt which is modified with such polymers.

U.S. Pat. No. 5,837,756, discloses a technique for synthesizing, by a continuous polymerization process, a styrene-butadiene polymer which is highly suitable for modifying asphalt. In fact, asphalt which is modified with this styrene-butadiene polymer is reported to exhibit improved force ductility, elastic recovery, toughness and tenacity. The process disclosed in U.S. patent application Ser. No. 08/864,098 comprising the steps of: (1) continuously charging 1,3-butadiene monomer, an organolithium compound, a polar modifier and an organic solvent into a first polymerization zone, (2) allowing the 1,3-butadiene monomer to polymerize in said first polymerization zone to a conversion of at least about 90 percent to produce a living polymer solution which is comprised of said organic solvent and living polybutadiene chains having a number average molecular weight which is within the range of about 20,000 to about 60,000, (3) continuously withdrawing said living polymer solution from said first reaction zone, (4) continuously charging styrene monomer, divinyl benzene and the living polymer solution being withdrawn from the first polymerization zone into a second polymerization zone, (5) allowing the styrene monomer and divinyl benzene monomer to polymerize in said second polymerization zone to produce a solution of styrene-butadiene polymer having a number average molecular weight which is within the range of about 30,000 to about 85,000 and (6) continuously withdrawing the solution of said styrene-butadiene polymer from the second polymerization zone. However, reactor fouling typically occurs when this process is carried out on a large scale commercial basis.

U.S. Pat. No. 5,837,756 further reveals an asphalt concrete which is comprised of (A) from about 90 weight percent to about 99 weight percent of an aggregate and (B) from about 1 weight percent to about 10 weight percent of a modified asphalt cement which is comprised of (i) from about 90 weight percent to about 99 weight percent asphalt; (ii) from about 1 weight percent to about 10 weight percent of a styrene-butadiene polymer made by a process which is comprised of the steps of: (1) continuously charging 1,3-butadiene monomer, an organolithium compound, a polar modifier and an organic solvent into a first polymerization zone, (2) allowing the 1,3-butadiene monomer to polymerize in said first polymerization zone to a conversion of at least about 90 percent to produce a living polymer solution which is comprised of said organic solvent and living polybutadiene chains having a number average molecular weight which is within the range of about 20,000 to about 60,000, (3) continuously withdrawing said living polymer solution from said first reaction zone, (4) continuously charging styrene monomer, divinyl benzene and the living polymer solution being withdrawn from the first polymerization zone into a second polymerization zone, (5) allowing the styrene monomer and divinyl benzene monomer to polymerize in said second polymerization zone to produce a solution of styrene-butadiene polymer having a number average molecular weight which is within the range of about 30,000 to about 85,000 and (6) continuously withdrawing the solution of said styrene-butadiene polymer from the second polymerization zone; and (iii) from about 0.1 weight percent to about 5 parts by weight of sulfur per 100 parts by weight of the styrene-butadiene polymer.

U.S. Pat. No. 5,837,756 also discloses a styrene-butadiene polymer which is particularly useful for modifying asphalt to improve force ductility, elastic recovery, toughness and tenacity, said styrene-butadiene polymer being comprised of a butadiene portion and a styrene portion, wherein said butadiene portion is comprised of repeat units which are derived from 1,3-butadiene, wherein said butadiene portion has a vinyl-microstructure content which is within the range of about 35 percent to about 80 percent, wherein said butadiene portion has a number average molecular weight which is within the range of about 20,000 to about 60,000, wherein said styrene portion branches into multiple arms at branch points which are derived from divinyl benzene, and wherein said styrene-butadiene polymer has a number average molecular weight which is within the range of about 30,000 to about 85,000.

SUMMARY OF THE INVENTION

By utilizing the process of this invention, a styrene-butadiene polymer which is particularly useful for modifying asphalt to improve force ductility, elastic recovery, toughness and tenacity can be synthesized continuously on a large-scale commercial basis without reactor fouling. The styrene-butadiene polymer made by this process is comprised of a butadiene portion and a styrene portion, wherein said butadiene portion is comprised of repeat units which are derived from 1,3-butadiene, wherein said butadiene portion has a vinyl-microstructure content which is within the range of about 35 percent to about 80 percent, wherein said butadiene portion has a number average molecular weight which is within the range of about 20,000 to about 60,000 and wherein said styrene-butadiene polymer has a number average molecular weight which is within the range of about 30,000 to about 85,000.

The present invention more specifically relates to a process for synthesizing a styrene-butadiene polymer, which is particularly useful for modifying asphalt to improve force ductility, elastic recovery, toughness and tenacity, said process comprising the steps of: (1) continuously charging 1,3-butadiene monomer, an organolithium compound, a polar modifier and an organic solvent into a first polymerization zone, (2) allowing the 1,3-butadiene monomer to polymerize in said first polymerization zone to a conversion of at least about 90 percent to produce a living polymer solution which is comprised of said organic solvent and living polybutadiene chains having a number average molecular weight which is within the range of about 20,000 to about 60,000, (3) continuously withdrawing said living polymer solution from said first polymerization zone, (4) continuously charging divinyl benzene and the living polymer solution being withdrawn from the first polymerization zone into a second polymerization zone, (5) allowing the divinyl benzene monomer to react with the living polybutadiene chains in said second polymerization zone to attain an increase in the dilute solution viscosity of the polymer cement of at least about 0.15 dl/g to produce a solution of living divinylbenzene modified butadiene polymer, (6) continuously withdrawing the solution of said divinylbenzene modified butadiene polymer from the second polymerization zone, (7) continuously charging styrene and the living divinylbenzene modified butadiene polymer being withdrawn from the second polymerization zone into a third polymerization zone, (8) allowing the styrene to polymerize in the third polymerization zone to produce a solution of styrene-butadiene polymer having a number average molecular weight which is within the range of about 30,000 to about 85,000 and (9) continuously withdrawing the solution of styrene-butadiene polymer from the third polymerization zone.

DETAILED DESCRIPTION OF THE INVENTION

The rubbery polymer which is used to modify asphalt cement in accordance with this invention is made by a continuous solution polymerization technique. In the first step of the procedure used, 1,3-butadiene monomer, an organolithium initiator, a polar modifier and an organic solvent are continuously charged into a first polymerization zone. The first polymerization zone will typically be a polymerization reactor or some other type of reaction vessel.

The organic solvent can be one or more aromatic, paraffinic or cycloparaffinic compounds. These organic solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene and the like, alone or in admixture. It is frequently desirable to utilize a mixture of different hexane isomers as the organic solvent. Such a mixture of hexane isomers is frequently referred to as simply "hexanes."

In the solution polymerizations of this invention, there will normally be from about 5 to about 35 weight percent monomers and polymer in the polymerization medium in the first polymerization zone and in the second polymerization zone. Such polymerization media at steady state are, of course, comprised of the organic solvent, the monomer, the polymer, the polar modifier, the organolithium initiator and, optionally, gel inhibiting agent. In most cases, it will be preferred for the polymerization medium to contain from 10 to 30 weight percent monomers and polymer. It is generally more preferred for the polymerization medium to contain 20 to 25 weight percent monomers and polymer.

A polar modifier is added to the first polymerization zone in an amount which is sufficient to produce a living polybutadiene chain having a vinyl content which is within the range of about 35 percent to about 80 percent. The living polybutadiene chain will preferably have a vinyl content which is within the range of about 40 percent to about 60 percent and will most preferably have a vinyl content which is within the range of about 45 percent to about 55. The segment or block in the styrene-butadiene polymer of this invention which is derived from butadiene will naturally have the same vinyl content as was in the living polybutadiene chain.

Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like. Dipiperidinoethane, dipyrrolidinoethane, diethylene glycol dimethyl ether, TMEDA and tetrahydrofuran are representative of highly preferred modifiers. U.S. Pat. No. 4,022,959 describes the use of ethers and tertiary amines as polar modifiers in greater detail.

It is generally desirable to include a gel inhibiting agent in the polymerization medium. Thus, it will normally be desirable to charge a gel inhibiting agent into the first polymerization zone. In most cases, 1,2-butadiene will be charged into the first polymerization zone as a gel inhibiting agent.

Polymerization is started by adding an organolithium compound to the polymerization medium in the first polymerization zone. The organolithium compound which can be utilized are organomonolithium compounds.

The organolithium compounds which can be utilized are normally organomonolithium compounds. The organolithium compounds which are preferred are alkyllithium compounds which are represented by the formula R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium.

As a general rule, in all anionic polymerizations, the molecular weight (Mooney viscosity) of the polymer produced is inversely proportional to the amount of initiator utilized. As a general rule, from about 0.01 to about 1 phm (parts per hundred parts of monomer by weight) of the organolithium compound will be employed. In most cases, it will be preferred to utilize from about 0.015 to about 0.4 phm of the organolithium compound with it being most preferred to utilize from about 0.13 phm to 0.25 phm of the organolithium compound.

In any case, the amount of organolithium initiator employed will be adjusted to produce living polybutadiene chains in the first polymerization zone having a number average molecular weight which is within the range of about 20,000 to about 60,000. It is normally preferred to utilize an amount of organolithium initiator which will result in the living polybutadiene chains having a number average molecular weight which is within the range of about 30,000 to about 50,000. It is generally more preferred to utilize an amount of organolithium initiator which will result in the living polybutadiene chains having a number average molecular weight which is within the range of about 35,000 to about 45,000 as they are continuously withdrawn from the first polymerization zone. This will typically correspond to a dilute solution viscosity (DSV) which is within the range of about 0.5 to about 0.7. The living polymer solution withdrawn from the first polymerization zone will preferably have a dilute solution viscosity which is within the range of about 0.6 to 0.7.

The process of this invention will typically be carried out at a temperature which is within the range of about −10° C. to about 150° C. It is normally preferred for the polymerization medium to be maintained at a temperature which is within the range of about 40° C. to about 110° C. throughout the process of this invention. It is typically most preferred for the process of this invention to be conducted at a temperature which is within the range of about 60° C. to about 95° C. The pressure used will normally be sufficient to maintain a substantially liquid phase under the conditions of the polymerization reaction.

The residence time in the first polymerization zone will be sufficient for there to be a substantially complete polymerization of 1,3-butadiene monomer into polymer. The conversion of monomer into polymer in the first polymerization zone will typically be at least about 90 percent. It is normally preferred for the monomer conversion in the first polymerization zone to be at least about 95 percent with conversions of at least about 97 percent being most preferred. The residence time in the first polymerization zone will typically be in the range of about 0.1 hours to about 2 hours. A residence time of about 0.2 hours to about 1 hour is normally preferred and a residence time of about 0.3 hours to about 0.7 hours is normally most preferred.

The solution of living polybutadiene made in the first polymerization zone is continuously withdrawn from the first polymerization zone and fed into the second polymerization zone. Divinyl benzene (DVB) will also be continuously fed into the second polymerization zone. Normally, from about 0.1 to about 1.5 moles of divinyl benzene will be charged into the second reaction zone per mole of organolithium compound charged into the first reaction zone. It is normally preferred to charge from about 0.2 to about 0.8 moles of divinyl benzene per mole of the organolithium initiator. It is normally more preferred to charge from about 0.3 to about 0.7 moles of divinyl benzene per mole of the organolithium initiator.

The residence time in the second polymerization zone will normally be within the range of about 0.2 hours to about 4 hours. A residence time of about 0.4 hours to about 3 hours is normally preferred and a residence time of about 0.7 hour to about 1.5 hours is normally most preferred. The dilute solution viscosity of the polymer solution (polymer cement) will increase by at least 0.15 dl/g in the second polymerization zone. The dilute solution viscosity of the divinylbenzene modified styrene-butadiene polymer solution withdrawn from the second polymerization zone will preferably be at least 0.2 dl/g greater than the living polymer solution coming from the first polymerization zone.

The solution of living divinylbenzene modified polybutadiene made in the second polymerization zone is continuously withdrawn from the first polymerization zone and fed into the third polymerization zone. Styrene is also continuously fed into the third polymerization zone. The amount of styrene charged will typically represent from about 15 weight percent to about 35 weight percent of the total monomer charge. Thus, the styrene-butadiene polymer being synthesized will typically contain from about 65 weight percent to about 85 weight percent repeat units which are derived from 1,3-butadiene and from about 15 weight percent to about 35 weight percent repeat units which are derived from styrene.

It is normally preferred to charge from about 20 weight percent to about 30 weight percent styrene, based upon the total monomer charge. It is normally most preferred to charge from about 24 weight percent to about 28 weight percent styrene, based upon the total monomer charge. Thus, the styrene-butadiene polymer being synthesized will preferably contain from about 70 weight percent to about 80 weight percent repeat units which are derived from 1,3-butadiene and from about 20 weight percent to about 30 weight percent repeat units which are derived from styrene. It is most preferred for the styrene-butadiene polymer being synthesized to contain from about 72 weight percent to about 76 weight percent repeat units which are derived from 1,3-butadiene and from about 24 weight percent to about 28 weight percent repeat units which are derived from styrene.

The residence time in the third polymerization zone will be sufficient for there to be a substantially complete polymerization of monomer into polymer. The conversion of monomer into polymer in the third polymerization zone will typically be at least about 90 percent. It is normally preferred for the monomer conversion in the second polymerization zone to be at least about 95 percent with conversions of at least about 97 percent being most preferred. The residence time in the first polymerization zone will typically be in the range of about 0.2 hour to about 4 hours. A residence time of about 0.4 hour to about 3 hours is normally preferred and a residence time of about 0.7 hour to about 1.5 hours is normally most preferred.

The styrene-butadiene polymer made will typically have a number average molecular weight which is within the range of about 30,000 to about 85,000. The styrene-butadiene polymer made will preferably have a number average molecular weight which is within the range of about 40,000 to about 75,000 and will most preferably have a number average molecular weight which is within the range of about 50,000 to about 65,000.

A solution of the styrene-butadiene polymer is continuously removed from the third polymerization zone. The styrene-butadiene polymer made can then be recovered from the organic solvent-by standard techniques; such as, steam-stripping, followed by decantation, filtration, centrification and the like. It is often desirable to precipitate the polymer from the organic solvent by the addition of lower alcohols containing from 1 to about 4 carbon atoms to the polymer solution. Suitable lower alcohols for precipitation of the rubbery polymer from the polymer cement include methanol, ethanol, isopropyl alcohol, n-propyl alcohol and t-butyl alcohol. The utilization of lower alcohols to precipitate the polymer from the polymer cement also "kills" the living polymer chains by inactivating lithium end groups. After the polymer is recovered from the organic solvent, steam-stripping can be employed to reduce the level of volatile organic compounds in the styrene-butadiene polymer. The styrene-butadiene polymer can then be employed in making the modified asphalt compositions of this invention.

Asphalt cement can be modified with the styrene-butadiene polymer of this invention by simply mixing the styrene-butadiene polymer into hot asphalt. The styrene-butadiene polymer will typically be mixed into the asphalt at a temperature which is within the range of about 130° C. to about 230° C. The styrene-butadiene polymer of this invention may be added to the asphalt in an amount which is within the range of from about 1 part by weight to about 10 parts by weight. Preferably, from about 1 part by weight to about 6 parts by weight of the styrene-butadiene polymer is added with amounts within the range of from about 2 parts by weight to about 4 parts by weight being particularly preferred. To attain a good dispersion of the styrene-butadiene polymer throughout the asphalt, this mixing will normally take at least about 2 hours. After the styrene-butadiene polymer has been well dispersed throughout the asphalt, elemental sulfur is added to the polymer/asphalt blend. Normally from about 0.1 to about 5 parts by weight of sulfur is added per 100 parts by weight of the styrene-butadiene polymer. In most cases, it is preferred to utilize from about 1 to about 4 parts by weight of sulfur per 100 parts by weight of the styrene-butadiene polymer. It is typically more preferred to utilize from about 2 to about 3 parts by weight of sulfur per 100 parts by weight of the styrene-butadiene polymer. After the styrene-butadiene polymer and the sulfur has been thoroughly mixed with the asphalt cement, one should store the modified asphalt cement at elevated temperatures to avoid solidification prior to use.

Virtually any type of asphalt can be employed in making the asphalt cement compositions of this invention. Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide and aromatic and chlorinated hydrocarbons. Bitumen is a generic term defined by ASTM as a class of black or dark-colored (solid, semi-solid or viscous) cementitious substances, natural or manufactured, composed principally of high molecular weight hydrocarbons, of which asphalts, tars, pitches and asphaltites are typical. ASTM further classifies asphalts or bituminous materials as solids, semi-solids or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter) and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range.

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. Some representative examples of asphalt cements that may be used in the present invention have an ASTM grade of AC-2.5, AC-5, AC-10, AC-20 and AC-40. The preferred asphalt cements include AC-5, AC-10 and AC-20.

In addition to the styrene-butadiene polymer, the sulfur and the asphalt cement, the modified asphalt cement of the present invention may contain other conventional additives. Examples of conventional additives include antistripping compounds, fibers, release agents and fillers. Some specific examples of additives which can be employed include kaolin clay, calcium carbonate, bentonite clay, sanders dust and cellulose fibers.

After the asphalt cement has been modified, it can be mixed with aggregate to make asphalt concrete using standard equipment and procedures utilized in making asphalt concrete. As a general rule, from about 1 weight percent to about 10 weight percent of the modified asphalt cement and from about 90 weight percent to about 99 weight percent aggregate will be included in the asphalt concrete. It is more typical for the asphalt concrete to contain from about 3 weight percent to about 8 weight percent of the modified asphalt cement and from about 92 weight percent to about 97 weight percent of the aggregate. It is normally preferred for the asphalt concrete to contain from about 4 weight percent to about 7 weight percent of the modified asphalt cement and from about 93 weight percent to about 96 weight percent of the aggregate.

The aggregate is mixed with the asphalt to attain an essentially homogeneous asphalt concrete. The aggregate is mixed with the asphalt cement utilizing conventional techniques and standard equipment. For instance, the aggregate can be mixed with asphalt to produce asphalt concrete on a continuous basis in a standard mixer.

Standard aggregate can be utilized in the practice of this invention. The aggregate is essentially a mixture containing rocks, stones, crushed stone, gravel and/or sand. The aggregate will typically have a wide distribution of particle sizes ranging from dust to golf ball size. The best particle size distribution varies from application to application. In many cases, it will be advantageous to coat the aggregate with latex in accordance with the teachings of U.S. Pat. No. 5,262,240 to improve resistance to stripping by water.

The asphalt concrete made using the modified asphalt cement of this invention can then be used to pave roads, highways, exit ramps, streets, driveways, parking lots, airport runways or airport taxiways utilizing conventional procedures. However, pavements made utilizing the asphalt concretes of this invention offer resistance to rutting, shoving and low temperature cracking. Additionally, they can be applied without encountering processing difficulties due to the latex used for the modification being incompatible with the asphalt.

This invention is illustrated by the following examples which are merely for the purpose of illustration and are not to be regarded as limiting the scope of the invention or the manner in which it can be practiced. Unless specifically indicated otherwise, all parts and percentages are given by weight.

COMPARATIVE EXAMPLE 1

In this experiment, a styrene-butadiene polymer was synthesized utilizing the continuous polymerization procedure described in U.S. Pat. No. 5,837,756. A two-reactor system which consisted of a 1-gallon first reactor and a 2-gallon second reactor was utilized with the polymerization temperature being maintained at about 190° F. (88° C.). In the procedure used, 1,3-butadiene was charged into the first reactor at a rate of 115.2 grams per minute, n-butyl lithium was charged into the first reactor as a 0.25 M solution at a rate of 1.6 grams per minute and TMEDA was charged into the first reactor as a 0.25 M solution at a rate of 1.04 grams per minute. The 1,3-butadiene monomer was charged into the reactor as a 16 weight percent premix solution in hexane. The residence time in the first reactor was 0.51 hours.

The solution of living polybutadiene made in the first reactor was charged into the second reactor. A premix solution of styrene in hexane and divinyl benzene was also charged into the second reactor. The styrene was charged into the second reactor at a rate of 27.9 grams per minute and the divinyl benzene was charged into the second reactor as a 0.5 M solution at a rate of 0.80 grams per minute. The styrene monomer was charged into the second reactor as a 22 weight percent solution in hexane. The residence time in the second reactor was 0.82 hours. The styrene-butadiene polymer being discharged from the second reactor was mixed with a solution containing 5 weight percent of an antioxidant and 5 weight percent isopropyl alcohol which was added at a rate of 4.91 grams per minute. The styrene-butadiene polymer made in this experiment had a Mooney ML-4 viscosity at 100° C. of 25 and a glass transition temperature of about −63° C. The styrene-butadiene polymer was also determined to have a number average molecular weight of about 55,000 and a weight average molecular weight of about 338,000.

One serious drawback to this polymerization process is that reactor fouling occurs after prolonged continuous operation. This reactor fouling is so serious that it ultimately plugs the reactor system and makes continuous operation impossible to maintain. This unacceptable level of reactor fouling is typically reached after a few days of continuous operation. The reactor fouling is also extremely difficult to remove from the reactor walls and agitator where it tends to build up. In fact, in commercial scale reactors, it would be necessary to remove the buildup of polymeric material with air hammers or like equipment. This is a highly labor-intensive operation that cannot be tolerated in a commercial scale polymerization process.

EXAMPLE 2

In this experiment, a styrene-butadiene polymer was synthesized utilizing the continuous polymerization procedure of this invention over a period of six days without any evidence of reactor fouling. A three-reactor system which consisted of a 1-gallon first reactor, a 2-gallon second reactor and a 2-gallon third reactor was utilized with the polymerization temperature being maintained at about 85° C. In the procedure used, 1,3-butadiene was charged into the first reactor at a rate of 117.55 grams per minute, n-butyl lithium was charged into the first reactor as a 0.25 M solution at a rate of 1.2769 grams per minute and TMEDA was charged into the first reactor as a 0.25 M solution at a rate of 1.2067 grams per minute. The 1,3-butadiene monomer was charged into the reactor as a 16 weight percent premix solution in hexane. The residence time in the first reactor was 0.25 hour.

The solution of living polybutadiene made in the first reactor was continuously charged into the second reactor. Divinyl benzene was also charged into the second reactor as a 0.5 M solution at a rate of 1.245 grams per minute. The residence time in the second reactor was 1 hour and the temperature was maintained at 85° C. The solution of divinylbenzene modified polybutadiene made in the second reactor was continuously withdrawn and fed into the third reactor.

Styrene was also continuously charged into the third reactor at a rate of 27.9 grams per minute.

The styrene monomer was charged into the third reactor as a 22 weight percent solution in hexane. The residence time in the second reactor was 1 hour. The styrene-butadiene polymer being discharged from the third reactor was mixed with a solution containing 5 weight percent of an antioxidant and 5 weight percent isopropyl alcohol which was added at a rate of 5.0316 grams per minute. The styrene-butadiene polymer made in this experiment had a Mooney ML-4 viscosity at 100° C. of 29.4 and a glass transition temperature of about −67° C. The styrene-butadiene polymer was also determined to have a number average molecular weight of about 51,000 and a weight average molecular weight of about 120,000.

COMPARATIVE EXAMPLE 3

In this experiment, asphalt was modified with the styrene-butadiene polymer made in Example 1 and with a conventional styrene-butadiene block copolymer (for comparative purposes). The conventional styrene-butadiene block copolymer which was evaluated was Solprene® 1205 25/75 styrene/butadiene linear block copolymer. A Texas Fuel & Asphalt AC-20 asphalt having an absolute viscosity of 2000 poise at 60° C. was used in this experiment. In the procedure used, 15.5 grams of the styrene-butadiene polymer of this invention or 15.5 grams of the Solprene® 1205 block copolymer were slowly stirred into the asphalt over a period of about 45 minutes at a temperature of about 350° F.–360° F. (177° C.–182° C.). Then, the polymer/asphalt blends were mixed for about 15 minutes in a Ross high speed mixer which was operated at a speed of 4200 rpm. Elemental sulfur was subsequently mixed into the polymer/asphalt blend over a period of about 2 minutes and the mixture was then slowly stirred over a period of 1 hour at a temperature of 350° F.–360° F. (177° C.–182° C.).

The physical properties of the modified asphalt cements made were then determined using standard test procedures. The strength and flexibility of the asphalt binder cement at moderate or low temperatures are measured by force ductility, toughness and tenacity. These properties measure the resistance to deformation. Increasing strength and toughness gives greater resistance to surface abrasion and wear and provides better retention of aggregate. Ductility was determined by ASTM D113. The force ductility, elastic recovery, toughness and tenacity of the two modified asphalt samples is reported in Table I.

The styrene-butadiene polymer was also determined to have excellent compatibility with asphalt. This was determined by utilizing a separation test wherein the modified asphalt sample was placed in a tube having a diameter of 1 inch (2.54 cm) and a length of 5.5 inches (14 cm) and heat in an oven at 325° F. (163° C.) for 48 hours. The tube was maintained in a vertical position throughout the heating step. The tube containing the asphalt sample was then placed in a freezer at about 20° F. (−70° C.) for a minimum of 4 hours. Then, the sample was removed from the freezer and cut into three portions of equal length. The ring and ball softening point of the top and bottom portions of the sample was then determined by ASTM Method D36. Compatibility is considered to be excellent in cases where the difference in temperature between the softening points between the top and bottom samples is no greater than 20° C. In the case at hand, this temperature difference was only 0.40° C. which indicates excellent compatibility.

TABLE I

|  | Styrene-Butadiene Polymer | Standard Block Polymer |
|---|---|---|
| Force Ductility, 800% | 2.73 lbs | 1.73 lbs |
| Force Ductility, 1000% | 2.85 lbs | 1.70 lbs |
| Elastic Recovery @ 10° C. | 62.5% | 65.0% |
| Toughness @ 25° C. | 122 lbs-in | 96 lbs-in |
| Tenacity @ 25° C. | 91 lbs-in | 60 lbs-in |

As can be seen from Table I, the asphalt which was modified with the styrene-butadiene polymer made by the process of Ser. No. 08/864,098 exhibited better force ductility at 800 percent elongation, better force ductility at 1000 percent elongation, comparable elastic recovery, better toughness and better tenacity then did the asphalt which was modified with the conventional styrene-butadiene block copolymer.

EXAMPLE 4

In this experiment, asphalt was modified with the styrene-butadiene polymer made in Example 2 and with a conventional styrene-butadiene block copolymer (for comparative purposes). The conventional styrene-butadiene block copolymer which was evaluated was Solprene® 1205 25/75 styrene/butadiene linear block copolymer. An Albina AC-20 asphalt was used in this experiment. In the procedure used, 15.5 grams of the styrene-butadiene polymer of this invention or 15.5 grams of the Solprene 1205 block copolymer were slowly stirred into the asphalt over a period of about 45 minutes at a temperature of about 350° F.–360° F. (177° C.–182° C.). Then, the polymer/asphalt blends were mixed for about 15 minutes in a Ross high speed mixer which was operated at a speed of 4200 rpm. Elemental sulfur was subsequently mixed into the polymer/asphalt blend over a period of about 2 minutes and the mixture was then slowly stirred over a period of 1 hour at a temperature of 350° F.–360° F. (177° C.–182° C.).

The physical properties of the modified asphalt cements made were then determined using standard test procedures. The strength and flexibility of the asphalt binder cement at moderate or low temperatures are measured by force ductility, toughness and tenacity. These properties measure the resistance to deformation. Increasing strength and toughness gives greater resistance to surface abrasion and wear and provides better retention of aggregate. Ductility was determined by ASTM D113. The force ductility, elastic recovery, toughness and tenacity of the two modified asphalt samples is reported in Table II.

The styrene-butadiene polymer was also determined to have excellent compatibility with asphalt. This was determined by utilizing a separation test wherein the modified asphalt sample was placed in a tube having a diameter of 1 inch (2.54 cm) and a length of 5.5 inches (14 cm) and heat in an oven at 325° F. (163° C.) for 48 hours. The tube was maintained in a vertical position throughout the heating step. The tube containing the asphalt sample was then placed in a freezer at about 20° F. (−7° C.) for a minimum of 4 hours. Then, the sample was removed from the freezer and cut into three portions of equal length. The ring and ball softening point of the top and bottom portions of the sample was then determined by ASTM Method D36. Compatibility is considered to be excellent in cases where the difference in temperature between the softening points between the top and bottom samples is no greater than 2° C. In the case at hand, this temperature difference was only 0.4° C. which indicates excellent compatibility.

TABLE II

|  | Styrene-Butadiene Polymer | Standard Block Polymer |
|---|---|---|
| Ductility, cm @ 4° C. | 76 | 60 |
| Force Ductility, 1000% | 1.14 lbs | 1.14 lbs |
| Elastic Recovery @ 10° C. | 63% | 70% |
| Toughness @ 25° C. | 102 lbs-in | 58 lbs-in |
| Tenacity @ 25° C. | 89 lbs-in | 46 lbs-in |

As can be seen from Table II, the asphalt which was modified with the styrene-butadiene polymer of this invention exhibited much better toughness and tenacity than did the asphalt which was modified with the conventional styrene-butadiene block copolymer. It also exhibited ductility and elastic recovery which were comparable to those of the asphalt made with the standard block copolymer.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing a styrene-butadiene polymer, which is particularly useful for modifying asphalt to improve force ductility, elastic recovery, toughness and tenacity, said process comprising the steps of: (1) continuously charging 1,3-butadiene monomer, an organolithium compound, a polar modifier and an organic solvent into a first polymerization zone, (2) allowing the 1,3-butadiene monomer to polymerize in said first polymerization zone to a conversion of at least 90 percent to produce a living polymer solution which is comprised of said organic solvent and living polybutadiene chains having a number average molecular weight which is within the range of 20,000 to 60,000, (3) continuously withdrawing said living polymer solution from said first polymerization zone, (4) continuously charging divinyl benzene and the living polymer solution being withdrawn from the first polymerization zone into a second polymerization zone, (5) allowing the divinyl benzene monomer to react with the living polybutadiene chains in said second polymerization zone to attain an increase in the dilute solution viscosity of the polymer cement of at least 0.15 dl/g to produce a solution of living divinylbenzene modified butadiene polymer, (6) continuously withdrawing the solution of said divinylbenzene modified butadiene polymer from the second polymerization zone, (7) continuously charging styrene and the living divinylbenzene modified butadiene polymer being withdrawn from the second polymerization zone into a third polymerization zone, (8) allowing the styrene to polymerize in the third polymerization zone to produce a solution of styrene-butadiene polymer having a number average molecular weight which is within the range of 30,000 to 85,000 and (9) continuously withdrawing the solution of styrene-butadiene polymer from the third polymerization zone.

2. A process as specified in claim 1 wherein the organolithium compound is an alkyl lithium compound of the formula R-Li, wherein R represents an alkyl group containing from 1 to 20 carbon atoms.

3. A process as specified in claim 2 wherein said polar modifier is selected from the group consisting of ethers and tertiary amines that act as Lewis bases.

4. A process as specified in claim 2 wherein said polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine and N-phenyl morpholine.

5. A process as specified in claim 2 wherein said polar modifier is selected from the group consisting of dipiperidinoethane, dipyrrolidinoethane, diethylene glycol dimethyl ether, tetrahydrofuran and N,N,N',N'-tetramethylethylenediamine.

6. A process as specified in claim 5 wherein the dilute solution viscosity of the divinylbenzene modified butadiene polymer being withdrawn from the second polymerization zone is at least 0.2 dl/g higher than the dilute solution viscosity of the living butadiene polymer being continuously charged into the second reactor.

7. A process as specified in claim 6 wherein said process is conducted at a temperature which is within the range of 40° C. to 110° C.

8. A process as specified in claim 7 wherein the residence time in the first polymerization zone is within the range of 0.1 hours to 2 hours, wherein the residence time in the second polymerization zone is within the range of 0.2 hours to 4 hours and wherein the residence time in the third polymerization zone is within the range of 0.2 hours to 4 hours.

9. A process as specified in claim 8 wherein the 1,3-butadiene is polymerized in the first polymerization zone to a conversion of at least 95 percent.

10. A process as specified in claim 9 wherein the total monomer charge includes 65 weight percent to 85 weight percent 1,3-butadiene and from 15 weight percent to 35 weight percent styrene.

11. A process as specified in claim 10 wherein the living polymer chains made in the first polymerization zone have a number average molecular weight which is within the range of 30,000 to 50,000.

12. A process as specified in claim 11 wherein the styrene-butadiene polymer has a number average molecular weight which is within the range of 40,000 to 75,000.

13. A process as specified in claim 12 wherein said polymerization is carried out in the presence of 1,2-butadiene as a gel inhibiting agent.

14. A process as specified in claim 13 wherein said process as conducted at a temperature which is within the range of 60° C. to 95° C.

15. A process as specified in claim 14 wherein the residence time in the first polymerization zone is within the range of 0.2 hours to 1 hour, wherein the residence time in the second polymerization zone is within the range of 0.4 hours to 3 hours and wherein the residence time in the third polymerization zone is within the range of 0.4 hours to 3 hours.

16. A process as specified in claim 15 wherein the total monomer charge includes 70 weight percent to 80 weight percent 1,3-butadiene and from 20 weight percent to 30 weight percent styrene.

17. A process as specified in claim 15 wherein a shortstop is added to the solution of the styrene-butadiene polymer after it is removed from the third polymerization zone.

18. A process as specified in claim 17 wherein the shortstop is isopropyl alcohol.

19. A process as specified in claim 16 wherein the polar modifier is N,N,N',N'-tetramethylethylenediamine.

20. A process as specified in claim 19 wherein the organolithium compound is n-butyl lithium.

21. A process as specified in claim 11 wherein the styrene-butadiene polymer has a number average molecular weight which is within the range of 50,000 to 65,000.

22. A process as specified in claim 21 wherein the residence time in the first polymerization zone is within the range of 0.3 hours to 0.7 hour, wherein the residence time in the second polymerization zone is within the range of 0.7 hours to 1.5 hours and wherein the residence time in the third polymerization zone is within the range of 0.7 hours to 1.5 hours.

* * * * *